Figure 1:
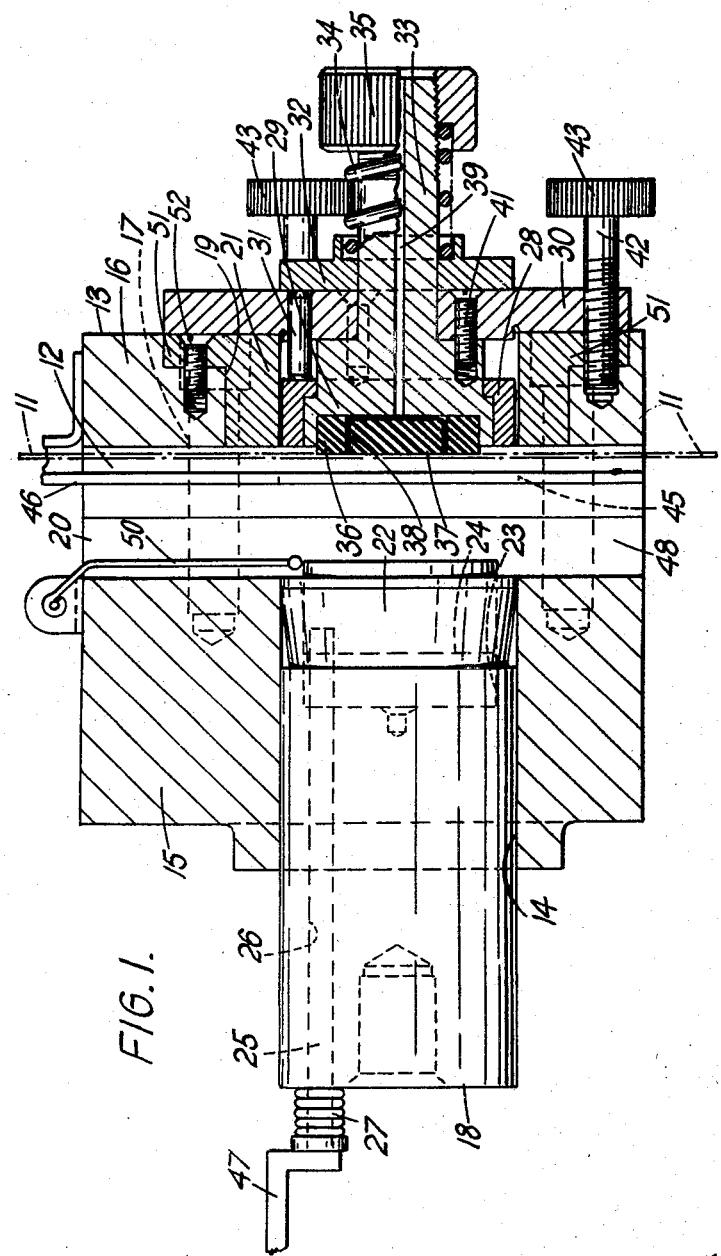

Sept. 29, 1959 D. EVANS 2,906,225
APPARATUS FOR THE MANUFACTURE OF METAL FOIL CAPS
Filed May 2, 1955 2 Sheets-Sheet 1

INVENTOR
DAVID EVANS
By Watson, Cole, Grindle & Watson
ATTORNEYS

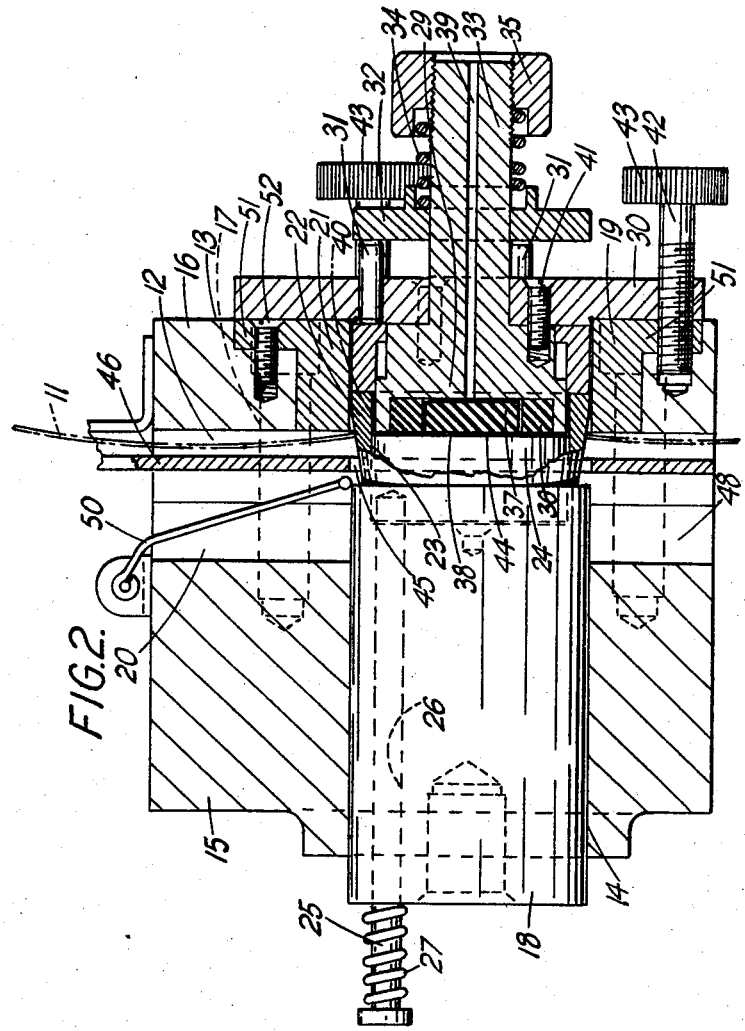

United States Patent Office 2,906,225
Patented Sept. 29, 1959

2,906,225

APPARATUS FOR THE MANUFACTURE OF METAL FOIL CAPS

David Evans, London, England

Application May 2, 1955, Serial No. 505,437

4 Claims. (Cl. 113—42)

This invention relates to apparatus for the manufacture of metal-foil caps for milk bottles and the like.

The object of the invention is to provide an improved apparatus for the forming and embossing of flanged metal-foil caps.

The apparatus according to the present invention comprises a head or block having two bores formed in line with one another to receive the cap-making tools, with a cavity between said bores accommodating a transverse guide-passage for metal foil feed-strip from which the caps are punched in succession, a reciprocable punch of tubular or sleeve form in one bore, a co-operating die ring in the other into which the punch slides for punching out each cap blank from the feed-strip, and a flanging member located within the die ring and over which the punch advances after the punching out operation to produce a flange around the cap rim, characterised by the fact that the die ring can be removed from and inserted in its bore through the end thereof opposite to that at which the punch enters.

In the preferred form, an axially slidable sleeve is provided within the die ring around the flanging member and is spring-urged in the direction of the punch the rim of the cap blank being held between the punch and the sleeve for the flanging operation.

An embossing tool is preferably located in the bore of the punch for embossing the cap, the embossed portion of the cap being backed up by the flanging member during the embossing operation.

A pressure pad of rubber or rubber-like material may be fitted in a recess in the flanging member facing the punch and embossing tool, to afford a resilient backing on which the cap bears during the embossing operation.

The embossing tool may be arranged for axial sliding movement within the bore of the punch to eject the formed cap from within the punch when the punch is withdrawn after the forming operation.

One construction of apparatus in accordance with the present invention will now be described by way of example, and with reference to the accompanying drawings, in which:

Figure 1 is a sectional elevation of the apparatus showing the punch retracted, and Figure 2 is a view similar to that of Figure 1 but showing the punch in operation to form a cap.

Referring to the drawings, metal-foil strip 11 from which flanged caps are to be formed is fed intermittently downwards through a guide passage 12 in a head 13. The head 13 comprises two main parts 15, 16 held together by bolts 17 and defining between them a cavity 20 through which passes the guide passage 12; the part 15 has a horizontal bore 14 in which there is slidable a punch 18 with a cutting head 22, while on the opposite side of the cavity 20 and guide passage 12 the part 16 has a bore 19 in line with, and shorter than and of greater diameter than, the bore 14, and the bore 19 contains a flanged die ring 21 to co-operate with the punch 18 in cutting out circular blanks from the strip 11. The bore 19 is recessed at its outer end to accommodate the flange 51 of the die ring, and the die ring is secured by three screws 52 passing through its flange into the part 16.

The punch 18 is formed with a co-axial circular section recess 23 at its cutting end, in which an embossing element 24 is slidable. At the rear end of the embossing element 24 is fitted a plunger 25 that projects through a clearance hole 26 in the rear end of the punch. On the external part of the plunger 25 is a coil compression spring 27 for holding the embossing element resiliently retracted within the punch. The punching element is reciprocated by any suitable means (not shown), as by an eccentric drive.

Within the die ring 21 in the bore 19 at the other side of the metal foil strip 11 is an axially-slidable sleeve 28 opposed to the punch 18. This sleeve 28 is mounted and slidable on a circular-section flanging element or boss 29 bolted, by bolts 41, to a face plate 30 secured to one end of the head 13 by means of three bolts 42 having knurled heads 43 and passing through the flange 51 of the die ring 21. The sleeve has behind it pins 31 that project through holes in the face plate 30 and engage a pressure plate 32 slidable on a central stem 33 which is formed as an extension of the boss 29 passing through the face plate 30. The pressure plate 32 is loaded by a coil compression spring 34 on the stem 33, and a knurled nut 35 screwed on a threaded end portion of the stem 33, and a knurled nut 35 screwed on a threaded end portion of the stem 33 enables the spring pressure on the plate to be adjusted. A recess 36 in the inner end of the boss 29 opposite the embossing element 24 is fitted with a pressure pad 37 of rubber or rubber-like material. Holes 38 are formed in the pad 37 and communicate with a central bore 39 in the stem 33 for expiration of any air from the face of the cap during embossing.

In the operation of the device, the metal foil strip 11 is fed down through the guide passage 12 in the cavity 20 of the head 13 between the punch 18 and the die ring 21 and assembly therein. During a dwell period of the strip, the punch advances towards the strip and in co-operation with the die ring 21, cuts out a circular blank. As the punch continues to move forward, the slidable sleeve 28 recedes before it and the rim 40 of the blank is flanged over the boss 29, as best shown in Figure 2. At the terminal movement of the punch (position of Figure 2), the embossing element 24 makes an impression on the now flanged cap 44, in co-operation with the pressure pad 37. During the retraction of the punch the formed cap 44 is first carried within its recess 23, the cap being pushed off the boss 29 by the return of the sleeve 28. After the punch 18 has carried the cap 44 back beyond the foil strip 11, and out of the guide passage 12, through an aperture 45 in a wall 46 of the passage, into the remaining space of the cavity 20, the plunger 25 engages a stop 47; as a consequence the embossing element 24 moves forwardly within the recess 23 of the punch to the position shown in Figure 1, thereby ejecting the formed cap 44, which then falls through a discharge slot 48 at the bottom of the cavity 20 into a suitable chute (not shown)

The ejection of the cap is assisted by a light hammer or striker device 50 consisting of a small roller on the end of a lever pivoted on the top of the head 13. For the greater part of the travel of the punch, the roller rides on top of it; but at the end of the rearward travel of the punch, the roller drops over the end thereof, and then strikes the top of the flanged cap as it is ejected so as to ensure that it does not stick on the face of the embossing tool.

It will be appreciated that the assembly within the die ring 21 can be very readily removed for inspection and servicing by screwing out the three bolts 42. This also gives direct access for removal of the die ring itself. The die ring is a good close fit in its bore and may be difficult to remove; consequently the flange 51 of the die ring can, if desired, be provided with two additional screw-threaded holes (not shown) at diametrically opposed positions to receive screws for jacking the die ring out of the bore. The jacking screws are threaded into said holes after removal of the face plate 30 and die ring securing screws 52, and progressive tightening of the jacking screws thereafter, against the end face of the part 16 causes the die ring to be steadily withdrawn. If the jacking screws are tightened evenly, the die ring is kept normal to its bore during removal and does not tend to become wedged.

The apparatus described is intended for use in conjunction with the intermittent strip feed apparatus described in our co-pending patent application Serial No. 505,436, filed May 2, 1955 now U.S. Patent No. 2,859,963.

I claim:

1. Apparatus for producing flanged metal foil caps comprising a housing in the form of a block having a guide passage through it for a metal-foil feed-strip from which the caps are to be punched in succession and having two cylindrical bores of different diameter formed in line with one another on opposite sides of the guide passage, a reciprocable punch of tubular form in the bore of smaller diameter, a cooperating removable die ring releasably secured in the other bore and into which the punch slides for punching out each cap blank from the feed strip, said other bore extending from the said guide passage to an external face of the block and being counter-bored at that face, said die ring being of tubular form and having an external flange which is received within said counter-bored portion of said other bore so that the die ring is removable from the block through the end of the said other bore opposite to that at which the punch enters, a flanging member located within the die ring and of smaller diameter than the internal diameter of the die ring over which flanging member the punch advances after the punching out operation to produce a flange around the cap rim, an axially slidable sleeve within the die ring around the flanging member which is spring urged in the direction of the punch and a chute for the delivery of formed caps from between the cap-forming tools.

2. Apparatus as claimed in claim 1, wherein an embossing tool is located in the bore of the punch for embossing the caps and a pad of rubber-like material is fitted in a recess in the flanging member facing the punch and embossing tool to afford a resilient backing on which the caps bear during the embossing operation.

3. Apparatus as claimed in claim 2, wherein a light pivoted striker device is arranged to ride over the punch during advancement thereof and to drop down beyond the working end of the punch on withdrawal to strike the arm of the formed cap as it is ejected and thereby ensure that the cap does not stick on the face of the embossing tool.

4. Apparatus for producing flanged metal foil caps comprising a block having two cylindrical bores formed in line with one another, and a cavity between said bores accommodating a transverse guide passage for metal foil feed-strip from which the caps are to be punched in succession, a reciprocable punch of tubular form in one bore, a cooperating removable die-ring in the other bore into which the punch slides for punching out the cap blanks from the feed strip, means for releasably securing the die-ring to the block, the said other bore in which the die-ring is situated extending through to the outside of the block and the die-ring being a close sliding fit in that bore whereby, when the releasable securing means is released, the die-ring can be removed from and inserted into the said other bore through the end thereof opposite that at which the punch enters, a flanging member located within the die-ring and over which the punch advances after the punching out operation to produce a flange around the cap blank and an axially slidable sleeve within the die-ring and around the flanging member which is spring urged in the direction of the punch.

References Cited in the file of this patent

UNITED STATES PATENTS

| | | |
|---|---|---|
| 11,363 | Dickinson | July 25, 1854 |
| 1,084,784 | Burpee | Jan. 20, 1914 |
| 1,192,066 | Jaffe | July 25, 1916 |
| 2,251,433 | Wareham | Aug. 5, 1941 |
| 2,585,047 | Scibelli | Feb. 12, 1952 |
| 2,614,515 | Wheeler | Oct. 21, 1952 |
| 2,662,498 | Jonsson | Dec. 15, 1953 |